United States Patent [19]

Bates et al.

[11] Patent Number: 5,534,887

[45] Date of Patent: Jul. 9, 1996

[54] LOCATOR ICON MECHANISM

[75] Inventors: Cary L. Bates, Rochester; Jeffrey M. Ryan; Byron T. Watts, both of Byron, all of Minn.

[73] Assignee: International Business Machines Corporation, Armonk, N.Y.

[21] Appl. No.: 198,748

[22] Filed: Feb. 18, 1994

[51] Int. Cl.$^6$ .................................................. G09G 5/14
[52] U.S. Cl. ............................................ 345/120; 395/159
[58] Field of Search .................................... 345/119, 120; 364/521; 395/157, 159

[56] References Cited

U.S. PATENT DOCUMENTS

| | | | |
|---|---|---|---|
| 5,050,104 | 9/1991 | Heyen et al. | 364/521 |
| 5,140,678 | 8/1992 | Torres | 395/157 |
| 5,333,256 | 7/1994 | Green et al. | 395/159 |

OTHER PUBLICATIONS

News & Analysis LAN Times, May 20, 1991, "Administrators Save Time with Chipcom Unix–Based System", Laura Didio, p. 14.

Digital Review, Feb. 13, 1989, pp. 43–46, "Windows On The VMS World", Tech Report/System Management & Security, Betty Y. Forman.

Personal Computing, Jul. 1987, Product Reviews, "A RAM-Hungry Partner", p. 176, Russ Lockwood.

*Primary Examiner*—Curtis Kuntz
*Assistant Examiner*—Vivian W. Chang
*Attorney, Agent, or Firm*—Owen J. Gamon

[57] ABSTRACT

A display apparatus and method that provides a windowing interface that gives the user the capability to identify and locate the particular window associated with a bell tone emitted by an application program. When a particular application emits a bell tone, the system displays a locator icon on the display. The text associated with the locator icon contains the window title, which tells the user which window caused the tone to be emitted. To go directly to the window that issued the bell, the user positions the pointing device over the locator icon and activates it to bring the icon into focus. At this time the icon vanishes and the window that emitted the bell tone is prominently displayed so the user can attend to it. If the user does not activate the locator icon and no other bell tones are emitted from the same window, then the locator icon will be removed from the display after a time period, which may be set by the user. When a window emits another bell tone while a locator icon is displayed for that window, the timer for the locator icon is reset so that it will remain on the display for the time period from the last bell tone emitted from the window.

23 Claims, 7 Drawing Sheets

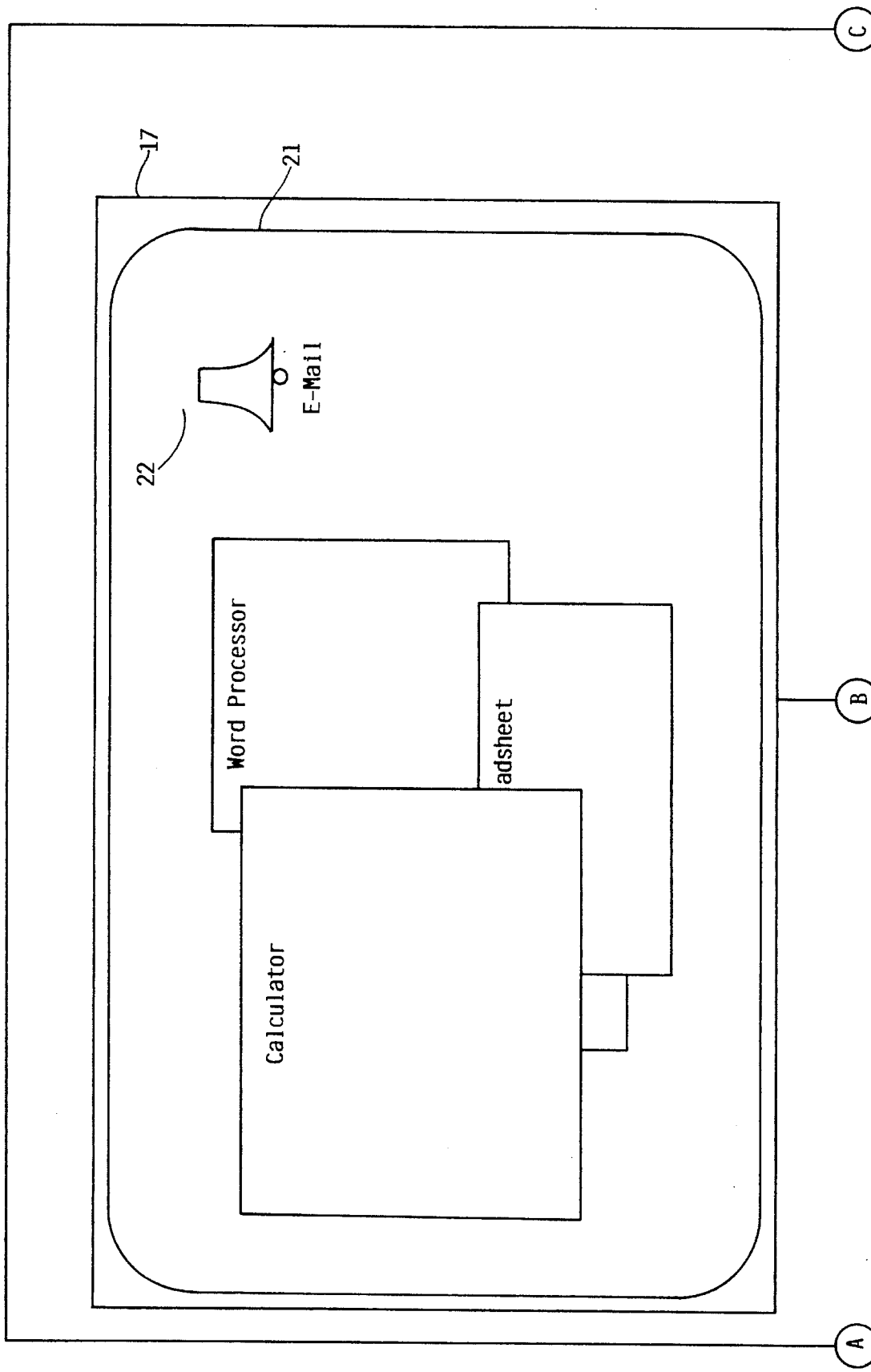
FIG. IA

LOCATOR ICON MECHANISM

FIELD OF THE INVENTION

This invention relates to the data processing field. More specifically, this invention relates to determining the window or object on a display screen that requires the user's attention.

BACKGROUND OF THE INVENTION

Early computer systems were controlled by batch operating systems. These systems had limited interaction with users of the system. An operator had to load the job to be run and send the output to a printer. With the advent of time sharing operating systems, such as the IBM System 370, interactive computing became the norm. Time sharing operating systems allowed many users to use the computer's resources simultaneously, so that all users of the system appeared to have their own computer system. All users had their own terminal, which was connected to the central computer system. This terminal typically consisted of a display, keyboard, and a small speaker. To the user, this terminal appeared to be an interactive computer system in its own right.

With the advent of computer systems that allowed truly interactive computer applications came a proliferation of user interfaces. Some of these interfaces were command driven, others were menu driven, but they all only allowed the user to work on only one task or application from a given terminal at a time. There are times when the application displays an important result or needs user intervention of some kind. Even when the executing application program is the only computer task with which the user is dealing, it is sometimes important for the application to seize the user's attention. For example, by the time a lengthy application has completed, such as a database search query, users may have grown weary of waiting and shifted their attention to other matters. To bring the user's attention back to the application that has just completed, applications typically used the speaker on the terminal to emit a tone, which has come to be known as a bell. In another example, users send electronic mail to each other. Since the user might not know when to expect a piece of electronic mail, the user's attention may be elsewhere when the mail arrives. To bring the user's attention to the piece of newly arrived mail, the incoming mail causes the speaker to emit a bell tone.

Today the state of the art for computer systems and user interfaces has advanced beyond the single task interface. Inexpensive personal computers and workstations with powerful graphics processors and multi-tasking operating systems such as IBM Operating System/2 have forever changed the way users interact with computer systems. With these operating systems the user can simultaneously work on many tasks at once, each task being confined to its own window. There may be many windows with active applications running at once. These windows may partially or even completely overlap. In addition, a window may be small, even to the point of being reduced to an icon (a symbol that represents the window), so that the window contents cannot be seen.

When an application program executing in one of the windows requires the user's attention, it still relies on the same method that application programs of the past did: it emits a bell tone using the speaker. The problem is, the tone provides the user with no help in determining which window emitted the bell. This forces the user to search through all the active windows on the display looking for the one that emitted the bell. If the number of windows is large, the emitting window is partially or completely overlapped by another window, or the emitting window has been reduced to a small size or icon, this can cause great frustration and loss of valuable time as the user pursues the elusive bell.

For the foregoing reasons, there is a need for a windowing interface that searches through the jumbled multitude of active windows on the display, informs the user which window requires attention, and optionally brings that window to the foreground.

SUMMARY OF THE INVENTION

It is an object of the present invention to provide an enhanced windowing system.

It is an object of this invention to provide an enhanced method and apparatus for determining which window requires the user's attention.

It is another object of this invention to provide an enhanced method and apparatus for transferring focus to the window that requires attention once a bell has been emitted.

It is yet another object of this invention to provide a method and apparatus for coalescing the emitting of a plurality of bells in rapid succession from a single task.

It is still another object of this invention to provide a method and apparatus for automatically removing the locator icon from the display if the user chooses not to act.

These and other objects are achieved by the computer system providing a windowing interface that gives the user the capability to identify and locate the particular window associated with a bell tone emitted by an application program. When a particular application emits a bell tone, the system displays a locator icon on the display. The text associated with the locator icon contains the window title, which tells the user which window caused the tone to be emitted. To go directly to the window that issued the bell, the user activates the locator icon by using the pointing device to select it. At this time the icon vanishes and the window that emitted the bell tone is prominently displayed so the user can attend to it. If the user does not activate the locator icon and no other bell tones are emitted from the same window, then the locator icon is removed from the display after a time period, which may be set by the user. Thus, the user is not required to respond to the bell tone. When a window emits another bell tone while a locator icon is displayed for that window, the time period for the locator icon is reset so that the locator icon will remain on the display for the time period from the last bell tone emitted from the window.

DETAILED DESCRIPTION OF PREFERRED EMBODIMENT

Figure 1B:
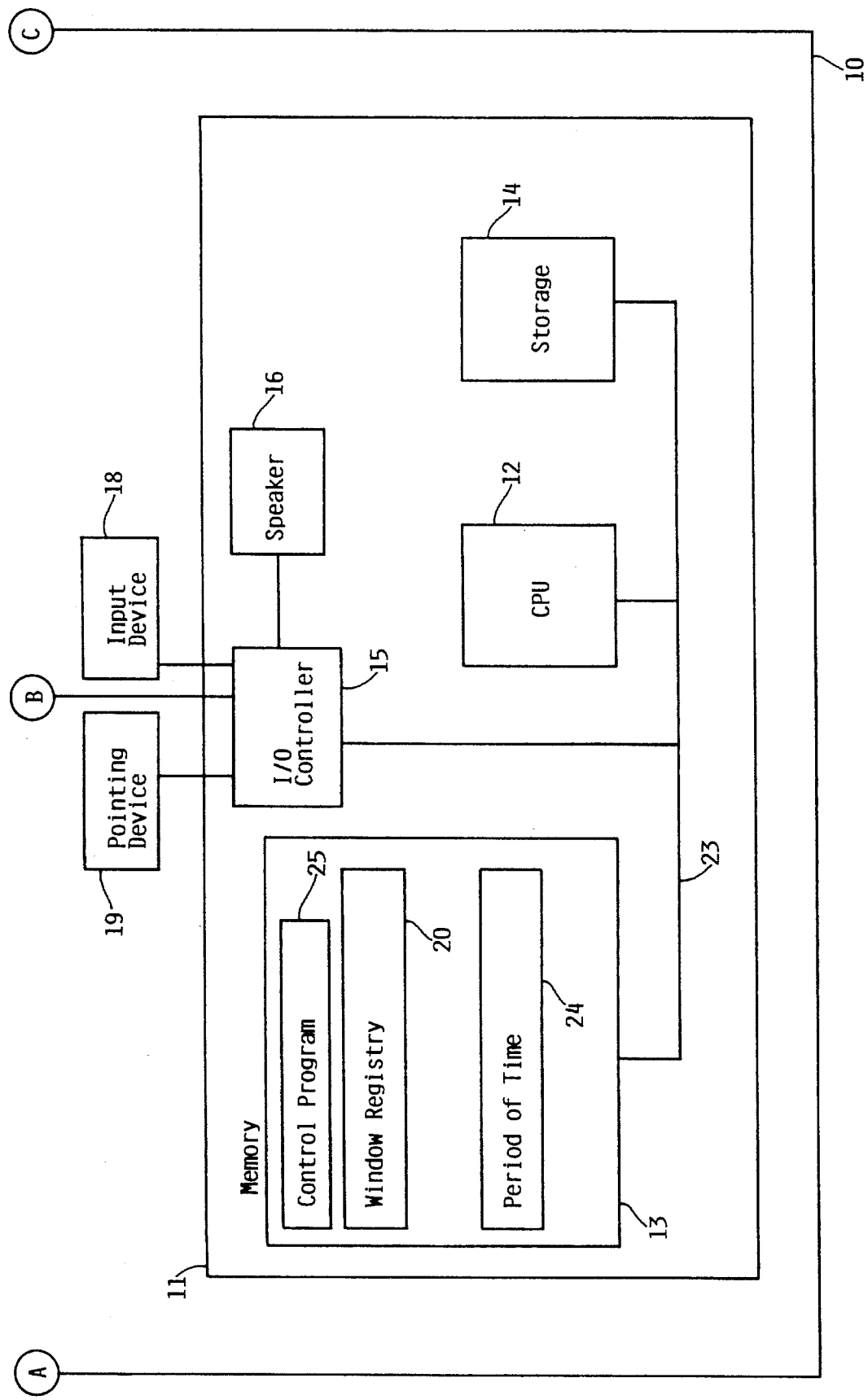
FIG. 1 shows a block diagram of the computer system of the preferred embodiment.

FIG. 1 shows a block diagram of computer system 10 of the preferred embodiment of the invention. Computer system 10 has display 17, input device 18, and pointing device 19, each of which is connected to system unit 11. Display 17 contains screen 21. In the preferred embodiment, input device 18 is a keyboard, but it could be any device capable of sending data or characters to an application in a window, including a speech recognition device. In the preferred embodiment, pointing device 19 is a mouse, but it could be any other pointing device capable of selecting objects on screen 21, such as a trackball, light pen, infra-red hand held control device, or speech recognition device. In the preferred embodiment, input device 18 and pointing device 19 are separate, but they could be the same device, or pointing device 19 could be mounted on input device 18 as in a keyboard that has a built in trackball. System unit 11 contains central processor unit (CPU) 12 connected via bus 23 to memory 13, storage 14, and I/O controller 15. Locator icon 22 displayed on screen 21 directs the user to the window associated with the application that emitted the bell tone. Although locator icon 22 is drawn as a bell in this example, it could be any shape meaningful to the user. In this example speaker 16, display 17, input device 18, and pointing device 19 are all connected to I/O controller 15, but it should be recognized that each could have its own controller. Speaker 16 is capable of emitting bell tones audible to the user.

In the preferred embodiment, CPU 12 is a general purpose programmable processor such as an Intel 80486 processor commonly used in personal computers. Memory 13 is a random access memory sufficiently large to hold the necessary programming and data structures. While memory 13 is shown as a single entity, it should be understood that memory 13 may in fact comprise a plurality of modules, and that memory may exist at multiple levels, from high-speed registers and caches to lower speed but larger DRAM chips. Memory 13 contains window registry 20, period of time 24, and control program 25. Window registry 20 and period of time 24 are the primary data structures of the preferred embodiment of the invention and will be explained in more detail under the description of FIG. 2. Control program 25 comprises a plurality of machine instructions that execute on CPU 12 to carry out this invention as described in more detail in the flowcharts of FIGS. 4, 5, and 6. The contents of memory 13 can be loaded and stored from and to storage 14 as needed. In the preferred embodiment, storage 14 is DASD (Direct Access Storage Device). While storage 14 is drawn as a single entity, it should be understood that storage 14 may in fact comprise a plurality of storage devices.

In the preferred embodiment, computer system 10 is an IBM PS/2 and display 17 is an IBM 8516 display. Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 could be a microcomputer such as described above but connected to a larger computer system such as an IBM AS/400.

Figure 2:
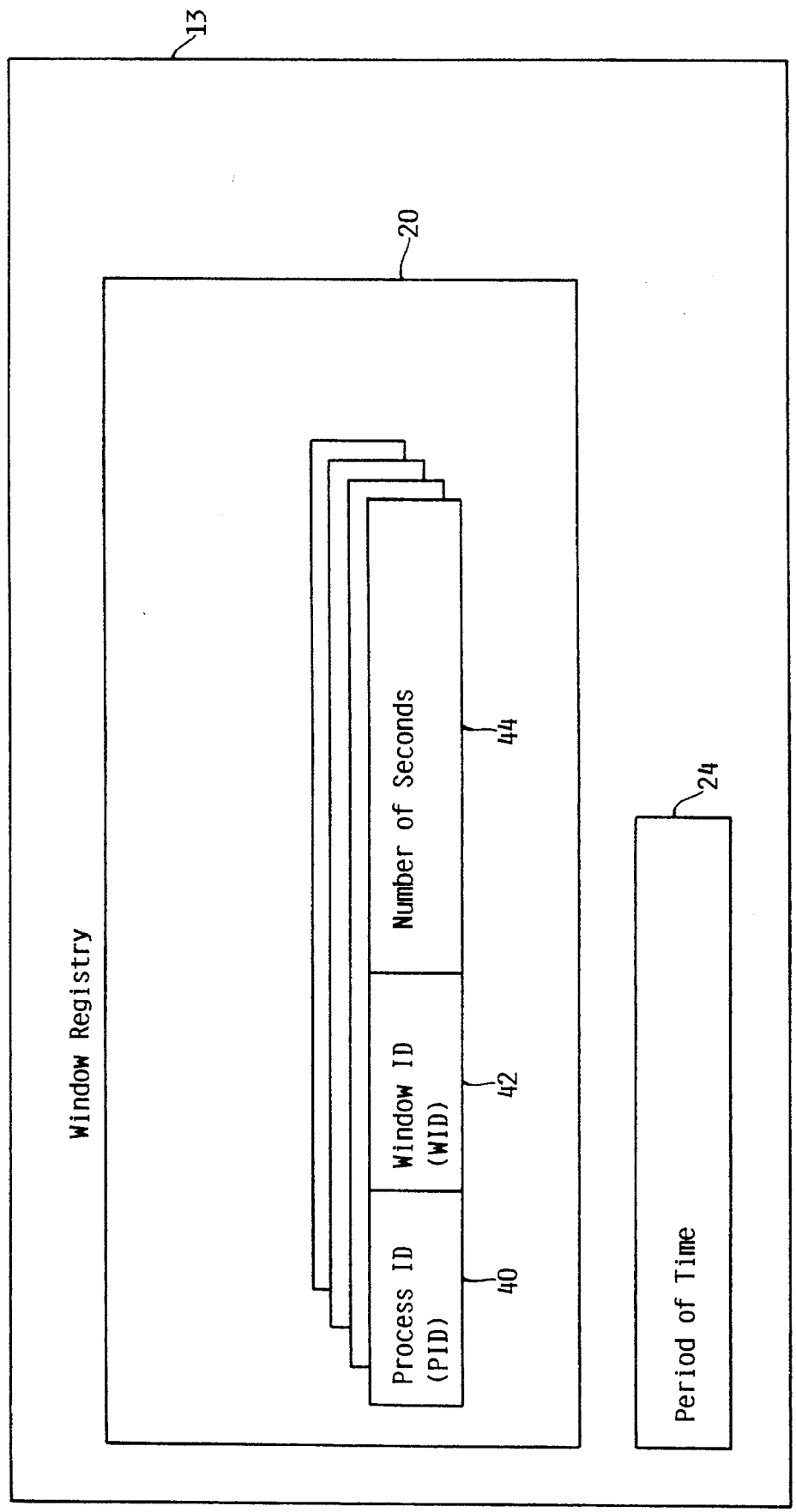
FIG. 2 shows the window registry of the preferred embodiment.
Figure 6:
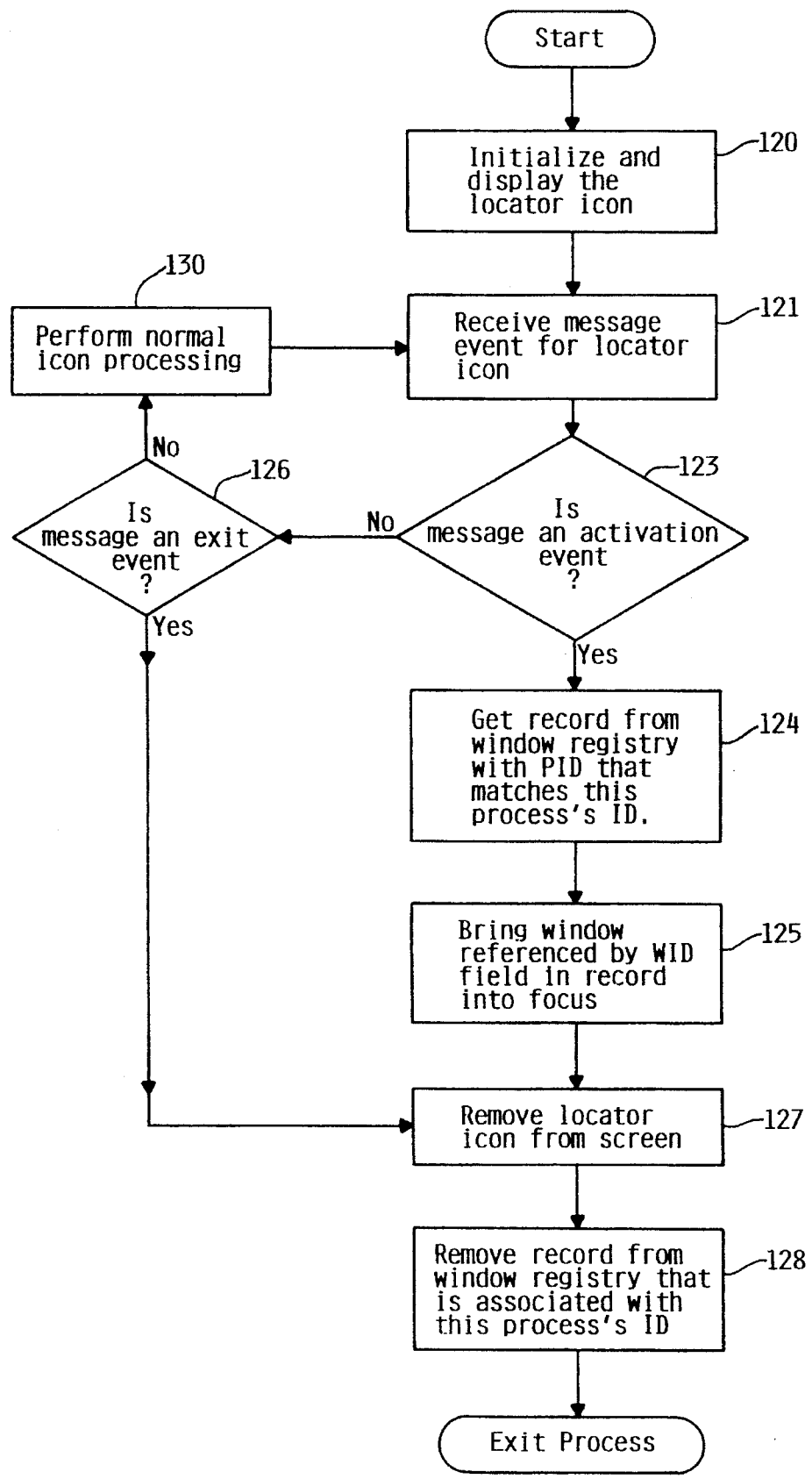

FIG. 2 shows period of time 24 and window registry 20, contained in memory 13. Window registry 20 is a list of records. For each locator icon 22 currently displayed on screen 21, there is one associated record in window registry 20. Each record in window registry.20 has the following fields:

PID 40 is the process identifier of the process described in FIG. 6 that is associated with the locator icon identified by this record;

Window Identifier (WID) 42 identifies the window that emitted the bell tone for the locator icon associated with this record; and Number of seconds 44 is the length of time remaining for the locator icon associated with this record to be displayed on screen 21.

Period of time 24 is the length of time that locator icon 22 will be displayed. In the preferred embodiment, period of time 24 is three seconds, however the user could also be given the capability to select the value.

Figure 3A:
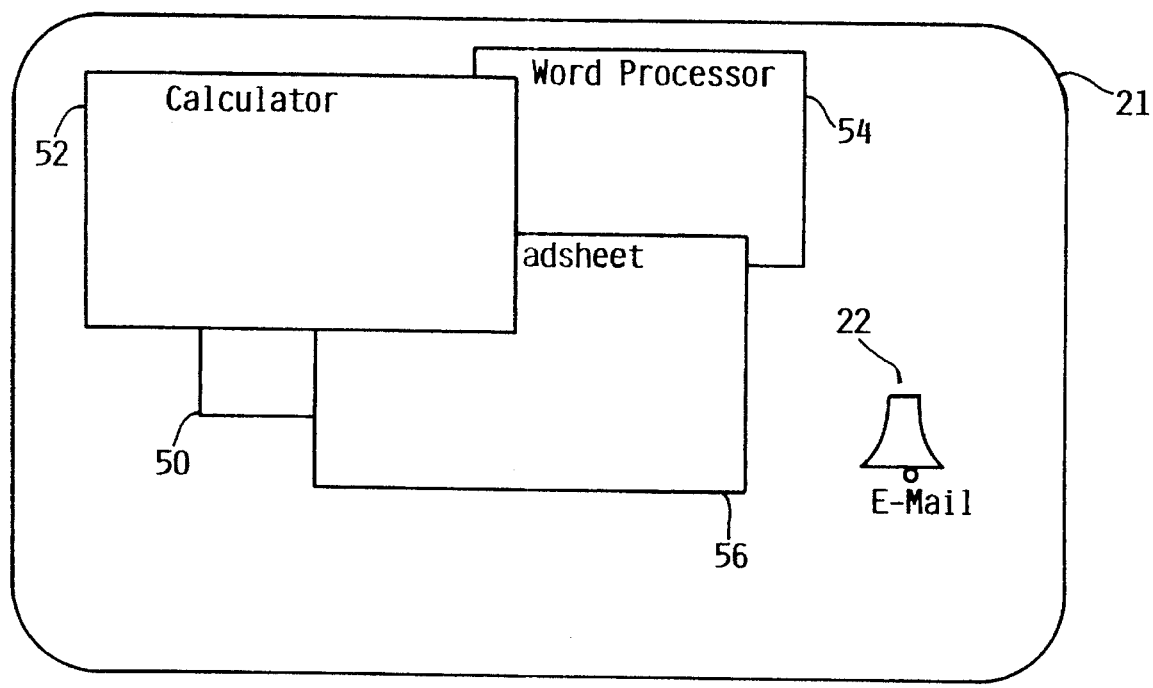
FIGS. 3A and 3B show an example of a locator icon being used to bring an electronic mail application, which issued a bell tone, to the foreground.

FIG. 3A shows an example of locator icon 22 on screen 21 after a bell tone has been emitted. In this example, the user has multiple windows open, represented by calculator window 52, word processor window 54, spreadsheet window 56 and E-mail window 50. The user is currently working on calculator window 52, which is in the foreground and overlays the other windows, when E-mail window 50 emits a bell tone to indicate that a piece of electronic mail has arrived. Because E-mail window 50 is almost completely overlaid by the other windows, the user cannot see the title of E-mail window 50, much less ascertain from the contents of E-mail window 50 that it has emitted the bell tone or that a piece of electronic mail has arrived. Locator icon 22 is displayed in response to the bell tone and includes the title of the window that issued the bell tone, in this example "E-Mail".

Figure 3B:
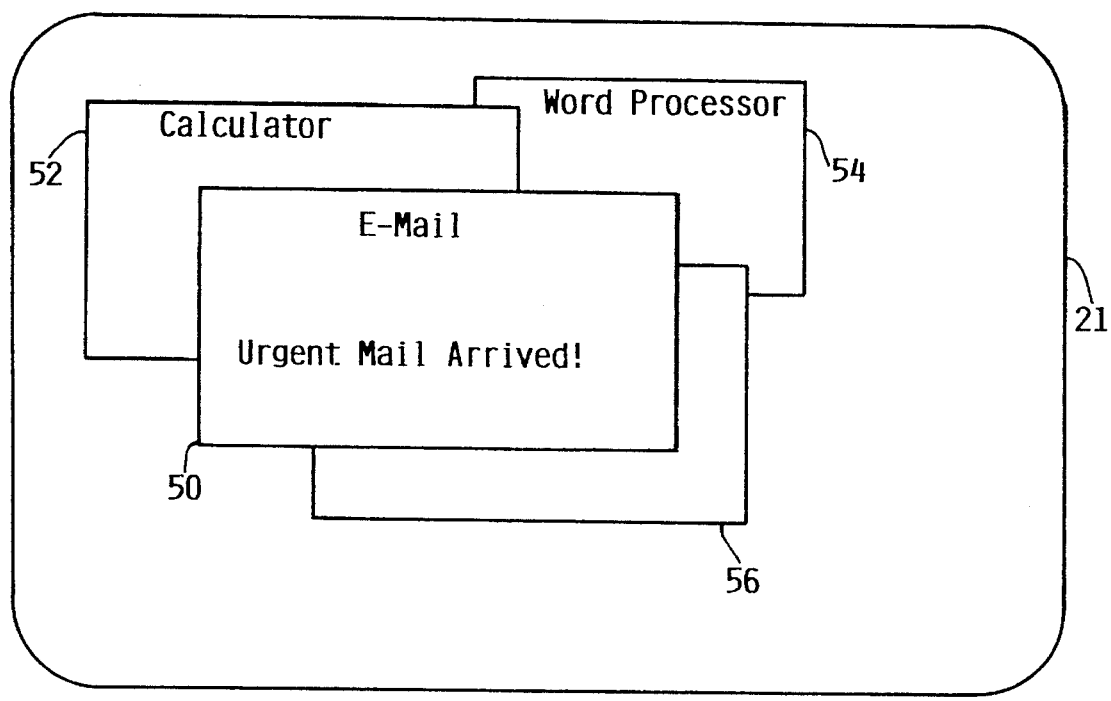

FIG. 3B shows the appearance of screen 21 after the user used pointing device 19 to select locator icon 22. E-mail window 50, which contains the application that generated the bell tone, has been brought to the foreground as a result of the selection and locator icon 22 has been removed from screen 21. E-mail window 50 has thus been brought into focus and is ready to accept input from the user.

Figure 4:
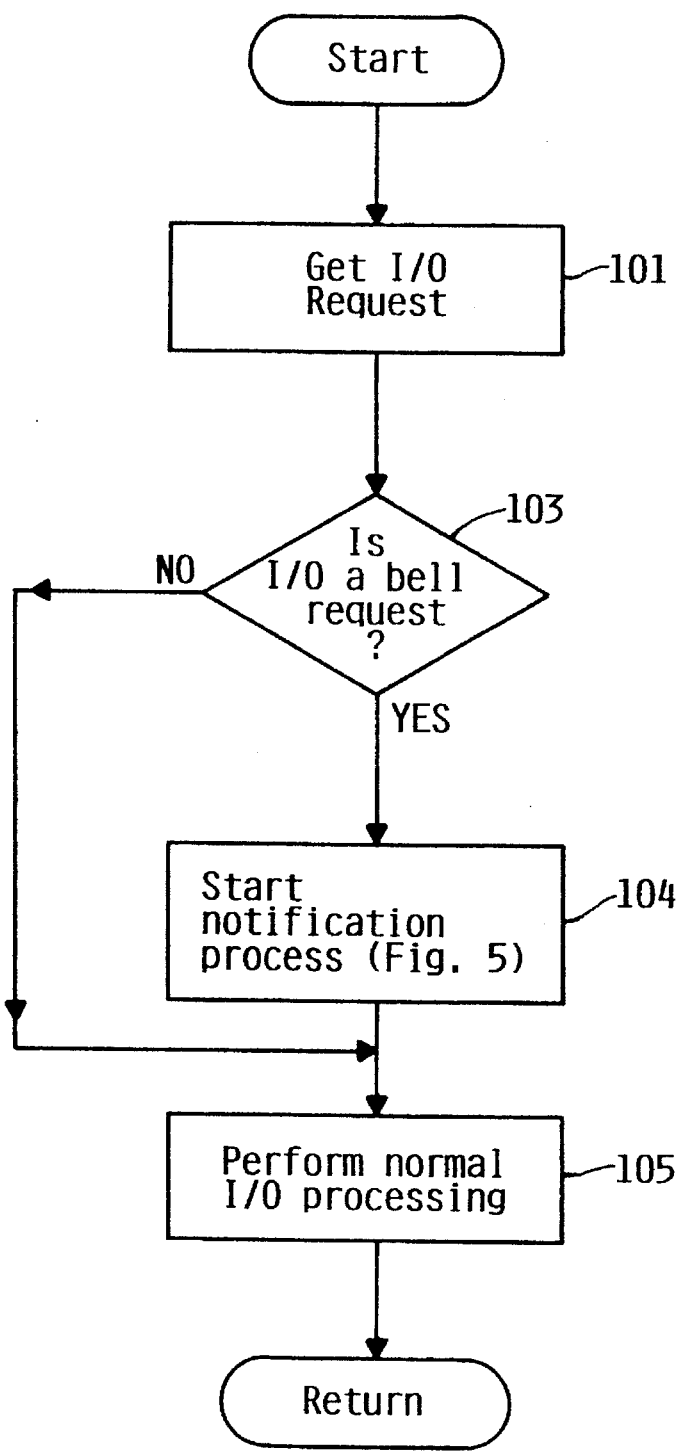
FIGS. 4, 5, and 6 show the flowcharts that describe the operation of the preferred embodiment.
Figure 5:
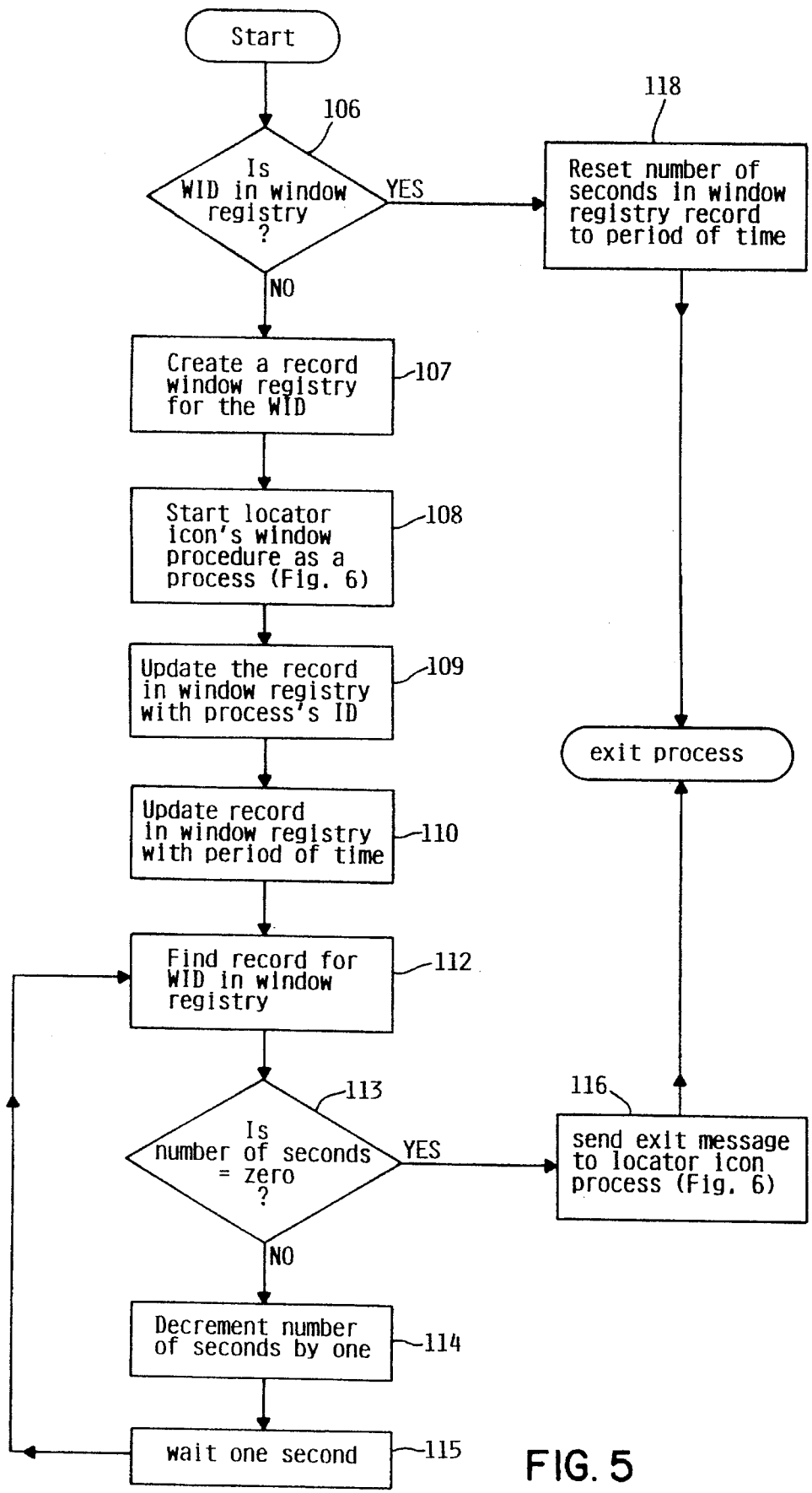

The operation of the preferred embodiment, as shown in the flowcharts of FIGS. 4–6 will now be described in more detail.

FIG. 4 shows a flow chart for the main input/output (I/O) processing routine of computer system 10. As shown by block 101, control program 25 receives an I/O request. All I/O requests generated on computer system 10 are received by control program 25 at block 101. At block 103, if control program 25 determines that the I/O request will not cause a bell tone to be generated, then control program 25 at block 105 performs the I/O processing that the system must do to handle the I/O request.

If control program 25 at block 103 determines that the I/O request will cause a bell tone to be generated, then control program 25 at block 104 starts the notification process described by FIG. 5. While the notification process described by FIG. 5 is executing, flow continues to control program 25 at block 105 of FIG. 4, which performs the processing that the system must do to handle the I/O request.

FIG. 5 shows a flow chart for creating, resetting, timing, and removing locator icon 22 from screen 21. Control program 25 at block 106 checks to see if the window associated with the I/O request already has a locator icon displayed by searching window registry 20 for a record that contains a value in WID 42 that matches the window identifier for the window that had the I/O request. If a matching window identifier is not found, then the window does not currently have a locator icon associated with it, so locator icon 22 will be displayed to the user via the actions of control program 25 as described in blocks 107 and 108. Control program 25 at block 107 creates a new record in window registry 20. Control program 25 at block 108 starts the process described by the flowchart of FIG. 6 running simultaneously and passes the window title into this process so that it will be displayed with locator icon 22. Control program 25 at block 109 saves the process ID of the process created by control program 25 at block 108 in the new record in window registry 20, and control program 25 at block 110 initializes number of seconds 44 to period of time 24, which is the period of time that locator icon 22 should be displayed.

Block 112 of control program 25 is the first block in a loop that works as a count down timer. Control program 25 at block 112 finds the record created by control program 25 at block 107 in window registry 20 so that any updates to this record will be discovered. Note that this record can be updated by control program 25 at block 118 from a different process, as discussed below. Control program 25 at block 113 checks number of seconds field 44 in the record. If number of seconds 44 is greater than zero, control program 25 at block 114 decrements number of seconds 44 by one. Control program 25 at block 115 waits one second before continuing back to control program 25 at block 112.

When number of seconds 44 is zero, control program 25 at block 113 is answered affirmatively, and flow continues to control program 25 at block 116. Control program 25 at block 116 sends an exit event message to the locator icon process (described in FIG. 6), which was started by control program 25 at block 108. This message tells the locator icon process to exit, and thus causes locator icon 22 to be removed from screen 21, as described below under the description for FIG. 6.

Referring to block 106 of FIG. 5, if a record exists in window registry 20 that contains a value in WID 42 that matches the window identifier of the window that issued the bell tone, then locator icon 22 already exists for this window, and another process exists in computer system 10 that is running the process described by the flowchart of FIG. 5. This window has thus issued more than one bell tone before the user could respond to the first locator icon. In this situation, control program 25 at block 118 resets number of seconds 44 to be period of time 24, so that locator icon 22 already displayed on screen 21 for the window will not be removed from screen 21 too soon. After blocks 118 and 116, the process exits.

FIG. 6 shows a flow chart of the process that controls locator icon 22. Referring to FIG. 6, control program 25 at block 120 displays locator icon 22 on screen 21 in a position not occupied by any other icon, with the window title passed from control program 25 at block 108 of FIG. 5 as its associated text. Control program 25 at block 121 will wait for messages to be sent to this process. After a message is received, control program 25 at block 123 determines if the message will cause the locator icon to be activated. Locator icon 22 is activated by the user selecting it. In the preferred embodiment, the user selects locator icon 22 via pointing device 19 by positioning the pointer associated with pointing device 19 over the locator icon and pressing a button on pointing device 19. However, it is not necessary that the pointing device have buttons. A light pen or speech recognition device could also be used. If the locator icon is to be activated, control program 25 at block 124 finds the record in window registry 20 that has a value for PID 40 that matches the process identifier for this process. Control program 25 at block 125 sends a message to the window whose WID 42 is in the retrieved record to bring it into focus so that it is the active window ready to accept input from the user via input device 18 or pointing device 19. If the window was in the background, i.e., partially or completely overlaid by other windows, it is brought to the foreground. If the window was reduced to an icon, it is restored so that it is ready for input and brought to the foreground. In the example illustrated by FIGS. 3A and 3B, the window brought into focus is E-Mail 50.

Referring again to FIG. 6, control program 25 at block 127 removes locator icon 22 from screen 21, and control program 25 at block 128 removes the record with a PID that matches the current process's ID from window registry 20. Referring to block 123, if the message is not a message that will cause locator icon 22 to be activated, then if control program 25 at block 126 determines that the message was an exit message, then control program 25 at block 127 removes locator icon 22 from screen 21 and control program 25 at block 128 removes the record from window registry 20. If control program 25 at block 126 determines that the message is not a exit message, then control program 25 at block 130 performs the routine processing for the normal window messages.

While this invention has been described with respect to the preferred and alternative embodiments, it will be understood by those skilled in the art that various changes in detail may be made therein without departing from the spirit, scope, and teaching of the invention. For example, the type of applications that use windows may change from what is known today. In addition, windowing technology may become widely employed in consumer applications such as operator panels for consumer electronics, appliances, and automobiles. Accordingly, the herein disclosed invention is to be limited only as specified in the following claims.

What is claimed is:

1. A display apparatus for locating a window on a screen that requires a user's attention, comprising:

first displaying means for displaying a first window on the screen such that contents of the first window that require the user's attention are not visible;

second displaying means for displaying a second window on the screen;

means for notifying the user that the first window requires the user's attention by displaying a first locator icon that identifies the first window; and focusing means for bringing the first window into focus so that the first window contents are visible and the first window is active and ready to accept input from the user, in response to the user selecting the first locator icon with a pointing device.

2. The apparatus of claim 1 wherein the first window has a title and the first locator icon identifies the first window by displaying the title.

3. The apparatus of claim 1 wherein the notifying means is in response to a first bell tone sent to the first window.

4. The apparatus of claim 1 wherein the first window is reduced to a icon.

5. The apparatus of claim 1 wherein the second window at least partially overlaps the first window so that the first window is in the background.

6. The apparatus of claim 1 wherein:

the focusing means further comprises bringing the first window to the foreground.

7. The apparatus of claim 1, further comprising:

means for removing the first locator icon if the user does not select the first locator icon within a period of time.

8. The apparatus of claim 7, wherein the period of time is set by the user.

9. The apparatus of claim 7, wherein the period of time is set by the display apparatus.

10. The apparatus of claim 1, further comprising:

means for sending a second bell tone to the first window before a period of time has elapsed; and means for removing the first locator icon if the user does not select the first locator icon within the period of time, calculated from when the second bell tone was sent to the first window.

11. The apparatus of claim 1, further comprising:

means for sending a second bell tone to the second window; and means for notifying the user in response to the second bell tone that the second window requires the user's attention by displaying a second locator icon that identifies the second window.

12. A computer system apparatus for locating a window that requires a user's attention, comprising:

a display containing a screen;

a processor connected to the display;

a pointing device connected to the processor;

means for displaying a first window on the screen;

means for displaying a second window on the screen that at least partially overlaps the first window, so that the first window is in the background;

means for sending a first bell tone to the first window;

means for notifying the user in response to the first bell tone that the first window requires the user's attention by displaying a first .locator icon that identifies the first window; and means for bringing the first window to the foreground so that the first window is active and ready to accept input from the user, in response to the user selecting the first locator icon with a pointing device.

13. A method for locating a window on a screen that requires a user's attention, comprising:

displaying a first window on the screen such that contents of the first window that require the user's attention are not visible;

displaying a second window screen;

notifying the user that the first window requires the user's attention by displaying a first locator icon that identifies the first window; and bringing the first window into focus so that the first window contents are visible and the first window is active and ready to accept input from the user, in response to the user selecting the first locator icon with a pointing device.

14. The method of claim 13 wherein the first window has a title and the first locator icon identifies the first window by displaying the title.

15. The method of claim 13 wherein the notifying means is in response to a first bell tone sent to the first window.

16. The method of claim 13 wherein the first window is reduced to a icon.

17. The method of claim 13 wherein the second window at least partially overlaps the first window so that the first window is in the background.

18. The method of claim 13 wherein:

the bringing step further comprises bringing the first window to the foreground.

19. The method of claim 13, further comprising:

removing the first locator icon if the user does not select the first locator icon within a period of time.

20. The method of claim 19, wherein the period of time is set by the user.

21. The method of claim 19, wherein the period of time is set by the display apparatus.

22. The method of claim 13, further comprising:

sending a second bell tone to the first window before a period of time has elapsed; and removing the first locator icon screen if the user does not select the first locator icon within the period of time, calculated from when the second bell tone was sent to the first window.

23. The method of claim 13, further comprising:

sending a second bell tone to the second window; and notifying the user in response to the second bell tone that the second window requires the user's attention by displaying a second locator icon that identifies the second window.

* * * * *